Feb. 9, 1960 C. M. KRAMSKOY 2,924,652
REMOTE GUIDANCE RADIO LINK
Filed April 19, 1955
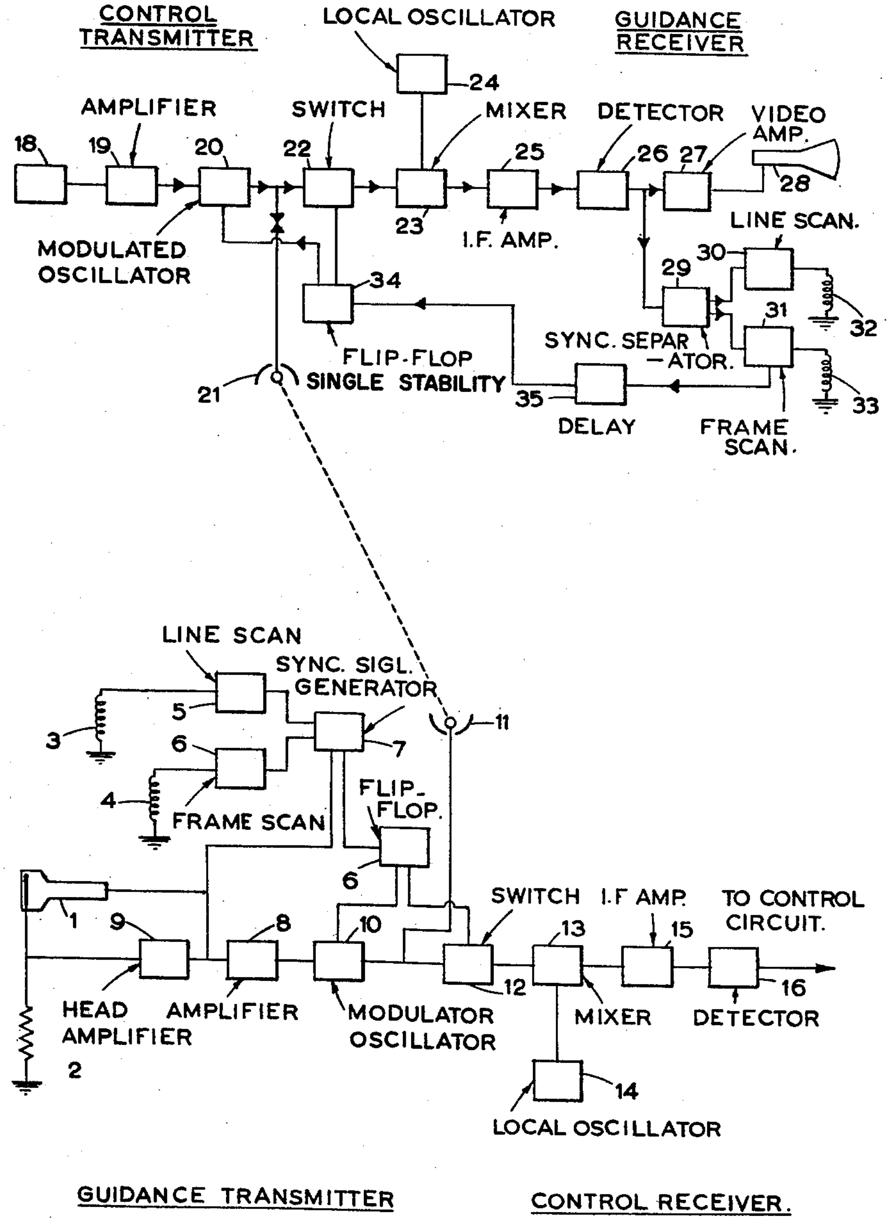
Inventor
C. M Kramskoy
By Mason Downing & Seebold
Attys.

United States Patent Office 2,924,652

Patented Feb. 9, 1960

2,924,652

REMOTE GUIDANCE RADIO LINK

Charles Mark Kramskoy, Ealing, London, England, assignor to Electric & Musical Industries Limited, Hayes, Middlesex, England, a company of Great Britain Application April 19, 1955, Serial No. 502,346

Claims priority, application Great Britain April 29, 1954

2 Claims. (Cl. 178—5.8)

This invention relates to radio links, and it relates especially though not exclusively to microwave radio links for providing two way communication between a guided object, such as a missile, and a guiding source, such as an aircraft.

In the case of missiles guided by an aircraft, the signal to be transmitted from the missile to the aircraft is a television signal (called the "guidance" signal), and may have frequencies present up to 3 mc./s. The signal from the aircraft to the missile (called the "control" signal) enables the missile to be controlled in flight from the aircraft and may not contain frequencies higher than 200 kc./s. An important consideration in the design of microwave links for use in such circumstances is the ability to operate a considerable number of such links simultaeously without mutual interference, since it may be desirable to control individually a considerable number of missiles at the same time from a single aircraft, or from a number of aircraft in the same locality.

The object of the present invention is to provide a two-way radio link which needs only a single carrier frequency, so that more links can be accommodated in a given band than would be the case if a separate carrier frequency were allocated to communication in each direction.

According to the present invention there is provided a radio link between a guided object and a guiding source comprising a television pick-up tube in the guided object for deriving guidance signals, normally operative means for transmitting said guidance signals and interspersed line and frame synchronising signals from said guided object, normally operative means at the guiding source for receiving said guidance and synchronising signals and including a cathode ray image reproducing tube having means for modulating the beam thereof in response to said guidance signals and for deflecting the beam thereof under control of said synchronising signals, normally inoperative means for transmitting control signals from said guiding source, normally inoperative means on the guided object for receiving the said control signals, switch means for rendering said first-mentioned transmitting means inoperative and for rendering said second-mentioned receiving means operative during intervals in guidance signals and following predetermined synchronising signals, and switch means responsive to said predetermined synchronising signals for rendering the second-mentioned transmitting means operative within said intervals.

In order that the invention may be clearly understood and readily carried into effect, the invention will be described with reference to the accompanying drawing, the single figure which illustrates diagrammatically and in block form one example of a microwave radio link in accordance with the present invention.

Referring to the drawing, the microwave radio link comprises a control transmitter and a guidance receiver mounted in an aircraft, and further comprises a guidance transmitter and a control receiver which are mounted in a missile. The guidance transmitter comprises a television pick-up tube 1 which may be of a conventional construction and which is arranged to generate electrical signals representing the sight from the missile, the signals appearing as voltage variations across a load resistor 2. The scanning of the beam in the pick-up tube 1 is effected by line and frame scanning coils 3 and 4 fed with suitable scanning currents from generators 5 and 6. These generators are in turn synchronised by keying pulses from a synchronising signal generator 7, which in addition to feeding keying pulses to the generators 5 and 6 feeds line and frame synchronising signals to the input of an amplifier 8. In the amplifier 8 the synchronising pulses are combined with the output of a head amplifier 9 which amplifies the video signals derived from the load resistor 2 of the pick-up tube. The synchronising signal waveform may be similar to that used in normal television practice and the combined video and synchronising signals, after amplification in the amplifier 8, are fed to a modulated oscillator 10 wherein they are caused to frequency modulate a carrier wave of high frequency, of the order of 4000 mc./s. for example. The modulated oscillator 10 may for example comprise a klystron. The output of the oscillator 10 is fed to an aerial represented diagrammatically at 11. This aerial is shared by the control receiver which apart from a switch 12, to be described subsequently, is of conventional construction. It comprises a mixer 13 wherein received signals are combined with the output of a local oscillator 14 to produce intermediate frequency signals which are then fed to an intermediate frequency amplifier 15 and thence to a frequency modulation detector 16. The output of the detector comprises control signals for the missile and they are fed to the control circuits, which may be of any suitable kind.

The switch 12 is introduced between the mixer 13 of the receiver and the aerial 11 and is such as to render the receiver normally inoperative. The switch 12 may for example comprise a gas tube which is arranged so that normally it provides a short circuit across the feeder from the aerial 11 to the mixer 13. The condition of the switch 12 can however be changed by the application to it of pulses derived from a flip-flop 17 when the flip-flop is switched to its unstable condition. The switching of the flip-flop 17 to its unstable condition is arranged to occur during frame return times in the guidance transmitter. As indicated in the drawing, the flip-flop is connected to the synchronisation signal generator and it receives a pulse at the end of each frame synchronising signal predetermined to switch the flip-flop to its unstable condition and thereby render the control receiver operative. A second output is taken from the flip-flop 17 and applied to the modulatesd oscillator 10 and it is arranged to switch off the oscillator when the flip-flop is in its unstable condition. For example the second control signal may be in the form of a bias which switches off the beam of the oscillator 10, assuming it to be a klystron. In other words, the guidance transmitter is rendered inoperative and the control receiver is rendered operative during an interval following each frame synchronising signal. It is arranged for example that the unstable period of the flip-flop 17 is of the order of 0.3 millisecond, whereupon the flip-flop returns to its stable condition, and restores the transmitter to its normal operative condition and the control receiver to its normal inoperative condition, until the termination of the next frame synchronising signal from the generator 7. The pulses for operating the flip-flop 17 may be derived in any suitable manner, using techniques which are well known in the television practice.

The control transmitter in the aircraft comprises a source of control signals for controlling the missile and represented by the block 18. The control signals are amplified in an amplifier 19 and thence fed to a modulated oscillator 20 which may be of the same construction as the oscillator 10 of the guidance transmitter. Moreover the carrier frequencies of the two modulated oscillators 10 and 20 are arranged to be the same. The carrier wave from the oscillator 20 modulated by the control signals is then fed to the aerial 21 which is common to the control transmitter and the guidance receiver. The guidance receiver comprises a switch 22 which may be of similar construction to the switch 12 in the control receiver and which is located between aerial 21 and the mixer stage 23 of the guidance receiver. The mixer is supplied with local oscillations from an oscillator 24 and the intermediate frequency output of the mixer 23 is applied to an intermediate frequency amplifier 25 and thence to a frequency modulation detector 26. The guidance receiver is arranged to receive the television signals transmitted by the guidance transmitter in the missile, and the output of the detector 26 is applied to a video signal amplifier 27 and thence to the modulator electrode of a cathode ray display tube 28. Moreover the output of the detector 26 is applied to a synchronising signal separator 29 of a conventional construction and arranged to set up two outputs, one comprising the frame synchronising pulses and the other comprising the line synchronising pulses of the television signals. These pulses are applied respectively to scanning waveform generators 30 and 31 which feed the respective scanning coils 32 and 33 of the display tube 28.

The switch 22 is normally in a condition to render the guidance receiver operative for the reception of the television signals transmitted from the guidance transmitter. The switch 22 is controlled by a flip-flop 34 which is similar to the flip-flop 17 and is normally in its stable condition. However the frame synchronising signals from the separator 29 are applied to the flip-flop 34 through a delay network 35 in such a way that each frame synchronising signal triggers the flip-flop to its unstable condition thereby to alter the condition of the switch 22 and render the guidance receiver inoperative for an interval determined by the unstable period of the flip-flop 34. A second output taken from the flip-flop 34 is applied to the modulated oscillator 20 of the control transmitter so that in the stable condition of the flip-flop the modulated oscillator 20 is switched off. The normal condition of the control transmitter is the inoperative condition but when the flip-flop 34 is switched to its unstable condition the modulated oscillator is switched on rendering the control transmitter operative for the duration of the unstable period of the flip-flop. The delay of the network 35 and the unstable period of the flip-flop 34 are predetermined to ensure that the intervals in which the control transmitter is rendered operative and the guidance receiver is rendered inoperative are wholly enclosed by the intervals when the guidance transmitter is rendered inoperative and the control receiver is rendered operative. For example a guard interval of 0.1 millisecond may be provided at the beginning and end of the interval when the control transmitter is operative to allow for the time taken for the signals to travel between the aircraft and the missile. With guard intervals of this duration, the unstable period required for the flip-flop 34 is of the order of 0.1 millisecond. The operation of the flip-flop 34 in the aircraft in response to delayed frame synchronising signals ensures that the synchronisation of the frame scanning generator 31 is not interfered with as a result of the switching on and off of the various transmitters and receivers. The frame return strokes on the guidance transmitter in the missile and at the guidance receiver in the aircraft may of course extend into the intervals when the guidance transmitter and guidance receiver are switched off.

What I claim is:

1. A radio link between a guided object and a guiding source comprising a television pick-up tube in the guided object for deriving guidance signals, normally operative means for transmitting said guidance signals and interspersed line and frame synchronising signals from said guided object, normally operative means at the guiding source for receiving said guidance and synchronising signals and including a cathode ray image reproducing tube having means for modulating the beam thereof in response to said guidance signals and for deflecting the beam thereof under control of said synchronising signals, normally inoperative means for transmitting control signals from said guiding source, normally inoperative means on the guided object for receiving the said control signals, switch means for rendering said first-mentioned transmitting means inoperative and for rendering said second-mentioned receiving means operative during intervals in guidance signals and following predetermined synchronising signals, and switch means responsive to said predetermined synchronising signals for rendering the second-mentioned transmitting means operative within said intervals.

2. A link according to claim 1 wherein said first switch means is responsive to frame synchronising signals to render said first-mentioned transmitting means inoperative during frame return intervals.

References Cited in the file of this patent

UNITED STATES PATENTS

| | | |
|---|---|---|
| 2,480,868 | Marshall | Sept. 6, 1949 |
| 2,521,721 | Hoffman et al. | Sept. 12, 1950 |
| 2,531,433 | Hoffman et al. | Nov. 28, 1950 |
| 2,649,262 | Fahrney | Aug. 18, 1953 |